United States Patent [19]
Selivansky

[11] Patent Number: 6,001,476
[45] Date of Patent: Dec. 14, 1999

[54] METHOD OF UPGRADING EXISTING NYLON FIBERS AND USE OF SAME FOR REINFORCEMENT OF CEMENTITIOUS COMPOSITES

[76] Inventor: Dror Selivansky, Hantke 65, Haifa, Israel, 34608

[21] Appl. No.: 08/844,546

[22] Filed: Apr. 18, 1997

[51] Int. Cl.[6] .................................................. C04B 14/38
[52] U.S. Cl. .............................. 428/395; 428/688; 106/99
[58] Field of Search ............................... 106/99; 428/395, 428/688

[56] References Cited

U.S. PATENT DOCUMENTS 4,902,347  2/1990  Soroushian et al. ...................... 106/99

Primary Examiner—Richard Weisberger
Attorney, Agent, or Firm—Mark M. Friedman

[57] ABSTRACT

A method for upgrading existing nylon fibers comprising the steps of (a) impregnating the existing nylon fibers with a chemical for obtaining impregnated nylon fibers; (b) drawing the impregnated nylon fibers for obtaining drawn nylon fibers; and (c) drying the drawn nylon fibers for obtaining upgraded nylon fibers. An upgraded nylon fiber, derived from an existing nylon fiber by the method. A nylon fiber reinforced hardened cementitious composite comprising a hardened cementitious matrix, the cementitious matrix including staples of textile or non-textile (technical) upgraded nylon fibers. In both cases the fibers are preferably upgraded using the method. A method for manufacturing a nylon fiber reinforced hardened cementitious composite. The method comprising the steps of (a) preparing a mix including a cementitious material, staples of upgraded nylon fibers and/or textile nylon fibers and an activating material (e.g., water) for activating said cementitious material to form a hardened cementitious matrix; (b) placing the mix; and (c) allowing the mix to harden.

23 Claims, No Drawings

METHOD OF UPGRADING EXISTING NYLON FIBERS AND USE OF SAME FOR REINFORCEMENT OF CEMENTITIOUS COMPOSITES

FIELD AND BACKGROUND OF THE INVENTION

The present invention relates to upgraded nylon fibers and to reinforced cementitious composites including same. More particularly the present invention relates to the use of non-aromatic polyamide (nylon) fibers or filaments (both are referred herein as fibers) in the production of cementitious composites, such as, but not limited to, types of concretes, shotcretes, mortars and the like. Most particularly the present invention relates to a method of upgrading the strength and durability of nylon fibers, such as textile nylon fibers, to render same suitable for use in reinforcing the cementitious matrix of cementitious composites, such as concrete.

As is well known in the art, cementitious composites, such as concrete, are prone to self induced cracking, as such composites are brittle by nature. Self induced cracks readily propagate through concrete under relatively low stresses. Thus, concrete fails in tension by progressive crack development.

The concrete's actual low tensile strength is explained by the presence of flaws (microcracks and cracks) that propagate into bigger cracks under tension. To increase the concrete durability, it is, therefore, important to minimize the presence of microcracks and cracks that are distributed therein, which weakens the concrete and reduces its durability.

When a mix of concrete, or any other mix of a cementitious composite, is placed (e.g., poured, molded, layered, sprayed, etc.), the solids, e.g., aggregates, fines and cement, therein begin to settle downward due to gravity. As the solids sink, water is displaced and forced to the surface as bleedwater. Plastic shrinkage cracking of the concrete occurs when the rate of water evaporation exceeds the rate of water displacement. Shrinkage stresses associated with early volume change account for the majority of all non-structural cracks in concrete. As mentioned above, these cracks, which are formed while the concrete mix settles, affect the strength and durability of the concrete during service. Therefore, in the common practice, concrete products are watered and cooled while hardening. However, as watering concrete products while hardening does not completely eliminate microcracks and cracks formation and calls for special care, the search for concrete additives which reduce cracks formation has begun.

The use of nylon fibers in the reinforcement of concrete is set forth in U.S. Pat. No. 3,645,961. This patent discloses the use of discrete fibers to form a blast resistance concrete. Other related publications include U.S. Pat. Nos. 5,456,752; 5,399,195; 4,693,749; 4,902,347; and U.S. Pat. No. 1479618.

The presence of nylon fibers in a concrete mix alter the process of solids settlement and water bleeding, and therefore reduce the internal tensile stresses that lead to plastic shrinkage cracking during the early volume changes of the concrete while hardening. The stress induced microcracks that do start to form are bridged and intersected by the millions of evenly distributed fibers present in the cementitious matrix, and cracks propagation is therefore halted.

Thus, nylon fibers assist in the prevention of microcracks during settling of concrete, which microcracks form flaws which, long after settling and during service, tend to develop into bigger cracks and fractions, which weaken the concrete and reduce its durability. Nevertheless, it is important to ensure that the fibers, which constitute part of the total volume of the cementitious matrix of the concrete, will not be deteriorated during service, since the loss of internal volume strength and substance will weaken the whole concrete matrix. Thus, the requirements from nylon fibers used in concrete reinforcement are (i) efficiency in reducing microcracks formation during settling and (ii) high durability, i.e., prolonged service before deteriorating.

A substantial growth in the use of technical nylon fibers for concrete and cement reinforcement has taken place since the first trials in using nylon fibers for concrete reinforcement. Both nylon 6.6 (e.g., Du Pont Type 663 and Type 665, both are distributed by Kapejo Inc.) and nylon 6 (e.g., Alliedsignal Caprolan-RC, distributed by Nycon Inc.) prepared having technical nylon properties, are used in the art of concrete production as typical concrete secondary reinforcing fibers, aimed at combating the cracking of the concrete during the early plastic stages of its settling. The term "secondary reinforcement" is commonly used in the art of concrete production to indicate a reinforcement directed at prevention or reducing cracks associated with concrete settling.

Technical nylon fibers were the fibers of choice, as compared to textile nylon fibers, due to their higher modulus and tenacity and lower elongation. These features of technical fibers render them more suitable for concrete reinforcement and, in fact, teach away the use of textile fibers to achieve same.

Further disadvantages of textile fibers include (i) their sensitivity to ultraviolet radiation due to the presence of delustrants, typically in the form of titanium dioxide grains, which are used in textile nylon fibers to provide the fibers with a darker appearance, yet are never used in technical nylon fibers; and (ii) their high surface area to volume ratio, higher permeability due to their open and more amorphous structure and the lack of stabilizers, all increases their hydrolysis rate in the presence of high pH values, as is the case in a wet concrete mix and in a concrete product exposed to even moderate humidity levels. Therefore, textile nylon fibers were never attempted as a concrete additive.

The term "textile nylon fibers" as used in the art of nylon production and herein refers to those fibers which are typically used to form yarns for the textile industry. Such fibers, although made of an identical material differ from technical nylon fibers in many physical properties, especially thickness and strength. This is due to their intended use and the specific manufacturing procedures employed while producing textile and technical nylon fibers.

Table 1 below compares between some physical parameters of textile and technical nylon fibers, wherein the numbers in brackets indicate the typical value.

TABLE 1

| Parameter | Textile nylon fibers | Technical nylon fibers |
|---|---|---|
| Thickness | 1–15 (3) Denier | 5–20 (7) Denier |
| Modulus | 25–40 (35) gram/Denier | 40–70 (55) gram/Denier |
| Bending modulus | low | high |
| Tenacity | 3–5 (4) gram/Denier | 7–11 (8) gram/Denier |
| Elongation | 35–45 (40) % | *10–20 (15)% |

TABLE 1-continued

| Parameter | Textile nylon fibers | Technical nylon fibers |
| --- | --- | --- |
| Crimp | present in some fibers | absent |
| Draw ratio during manufacture | 3–4 (3.5) X | 5–8 (6) X |
| Relative Viscosity* | 35–45 (35) | 60–100 (80) |
| Other additives** | delustrant (titanium dioxide) | UV stabilizers such as Mn salts; Thermal stabilizers, such as $CuI_2$, KI and KBr; and Anti oxidants, such as phosphorous, amino and phenolic compounds |

*when the fibers are dissolved in 90% formic acid to form a 8.4% solution, by weight, which viscosity is indicative to the number averaged molecular weight of the fibers, according to the standard convention.
**added to the polymer mix before the formation of fibers during the manufacturing process.

It will, however, be appreciated that should the textile nylon fibers be modified to have higher modulus and tenacity, lower elongation, and UV and high pH resistance, such fibers will become highly suitable as a concrete reinforcement additive, since (i) their high surface area to volume ratio and therefore high specific hydrophilicity will allow them to form tighter chemical interactions with the cementitious matrix of the concrete during settling and, therefore, such fibers will function better in microcracks prevention during the settling stages; (ii) their high surface area to volume ratio and hydrophilicity provides such fibers with better water retention capabilities, which will reduce segregation and water bleeding; (iii) their crimpness (if present) will improve the trixothrophy and flow properties of the wet cementitious matrix, which may find uses in some applications, especially in shotcretes, mortars and grouts; (iv) their low thickness will ensure their higher abundance (number per volume) and will, therefore, bring about better mechanical interactions with the microcracks and, as a result, will provide better cracks prevention performances during settling and therefore better reinforcement during service; and finally (v) due to their lower bending modulus, they will not tend to protrude from the surface of the cementitious composite, as fibers having higher bending modulus such as technical fibers tend to do, and, as such, they will be less prone to harmful environmental conditions (ultraviolet radiation, humidity, heat, etc.) and will bring about better results in some concrete finishing procedures (e.g., Helicopter treatment to smoothen concrete surfaces), wherein the presence of a "beard" is limiting, as the protruding fibers tend to entangle and form small balls.

There is thus a widely recognized need for, and it would be highly advantageous to have, a method to acquire existing textile nylon fibers the required properties and using same for cementitious composites reinforcement. The present invention improves the stability and durability of nylon fibers when used for concrete reinforcement through chemical and thermo mechanical treatments. The mechanical properties of non technical nylon fibers treated according to the teachings of the present invention are improved, as they are strengthened. The nylon fibers of the present invention are superior to any existing fibers of their type in terms of concrete environmental and service stability. The present invention, therefore, facilitates the upgrading of existing standard and low quality nylon fibers rendering same applicable in cementitious composites secondary reinforcement.

Thus, upgraded nylon fibers are provided by the present invention for use as superior fibers for secondary reinforcement of concrete and other cementitious composites. The textile nylon fibers according to the present invention are used in the reinforcement of concrete as an alternative to the prior art wire mesh, polypropylene fibers and technical nylon fibers, and are successful in inhibiting shrinkage cracking, increasing impact capacity, reducing permeability, adding shatter resistance and reducing construction time.

SUMMARY OF THE INVENTION

According to the present invention there is provided a method for upgrading existing nylon fibers, such as textile or technical nylon fibers, to be used, for example, as an additive to reinforce hardened cementitious composites, such as concrete.

According to further features in preferred embodiments of the invention described below, provided is a method for upgrading existing nylon fibers, the method comprising the steps of (a) impregnating the existing nylon fibers with a chemical for obtaining impregnated nylon fibers; (b) drawing the impregnated nylon fibers for obtaining drawn nylon fibers; and (c) drying the drawn nylon fibers for obtaining upgraded nylon fibers.

According to still further features in the described preferred embodiments the existing nylon fibers are selected from the group consisting of technical nylon fibers and textile nylon fibers.

According to still further features in the described preferred embodiments the existing nylon fibers include a nylon material selected from the group consisting of nylon 6.6, nylon 6, copolymer nylon 6.6, 6, copolymer nylon 6.6, 6.TA and nylon 6.4.

According to still further features in the described preferred embodiments the drawing of the impregnated nylon fibers includes hot wet and dry drawing and relaxing of the impregnated nylon fibers for obtaining the drawn nylon fibers.

According to still further features in the described preferred embodiments the upgraded nylon fibers are used as an additive to a cementitious composite and serve for reinforcing the cementitious composite, the method further comprising the step of (d) cutting the upgraded nylon fibers into staples.

According to still further features in the described preferred embodiments the upgraded nylon fibers acquire superior basic hydrolysis resistance and superior ultraviolet stability as compared with the existing nylon fibers.

According to still further features in the described preferred embodiments the upgraded nylon fibers acquire higher degree of crystallinity and orientation, relaxed frozen stresses and highly oriented amorphous phase, as compared with the existing nylon fibers.

According to still further features in the described preferred embodiments the upgraded nylon fibers acquire superior mechanical strength and superior mechanical strength retention when exposed to humidity and elevated temperature conditions, as compared with the existing nylon fibers.

According to still further features in the described preferred embodiments the existing fibers have a Denier ranging between 1–15.

According to still further features in the described preferred embodiments the existing fibers have differing cross sections.

According to still further features in the described preferred embodiments the existing fibers are crimped fibers.

According to still further features in the described preferred embodiments the chemical is selected from the group consisting of a salt that undergoes acid hydrolysis, benzene phosphonic acid, a manganese salt, a hindered phenol photo stabilizer, a hindered amine photo stabilizer, a phosphorous compound for ultraviolet stabilization, a phosphorous, amino and phenolic based antioxidants and copper iodide, copper acetate, potassium iodide, potassium bromide, zinc chloride and microsilica.

According to still further features in the described preferred embodiments step (a) and step (b) of the method are executed at least partially simultaneously.

According to still further features in the described preferred embodiments of the invention described below, provided is an upgraded nylon fiber, derived from an existing nylon fiber by the above method.

According to still further features in the described preferred embodiments of the invention described below, provided is an upgraded nylon fiber comprising an existing nylon fiber and a chemical impregnated onto the existing nylon fiber.

According to still further features in the described preferred embodiments the chemical is selected from the group consisting of a salt that undergoes acid hydrolysis, benzene phosphonic acid, a manganese salt, a hindered phenol photo stabilizer, a hindered amine photo stabilizer, a phosphorous compound for ultraviolet stabilization, a phosphorous, amino and phenolic based antioxidants and copper iodide, copper acetate, potassium iodide, potassium bromide, zinc chloride and microsilica.

According to still further features in the described preferred embodiments of the invention described below, provided is a nylon fiber reinforced hardened cementitious composite comprising a hardened cementitious matrix, the cementitious matrix including staples of textile or non-textile (technical) upgraded nylon fibers. In both cases the fibers are preferably upgraded using the above method.

According to still further features in the described preferred embodiments of the invention described below, provided is a method for manufacturing a nylon fiber reinforced hardened cementitious composite. The method comprising the steps of (a) preparing a mix including a cementitious material, staples of upgraded nylon fibers and/or textile nylon fibers and an activating material (e.g., water) for activating said cementitious material to form a hardened cementitious matrix; (b) placing the mix; and (c) allowing the mix to harden.

The present invention successfully addresses the shortcomings of the presently known configurations by providing a method for upgrading existing nylon fibers to be used as an additive in cementitious composites, thereby, existing textile nylon fibers, which otherwise form waste, can be used as raw materials in the concrete industry. Furthermore, using the upgraded fibers according to the invention to reinforce cementitious composites have advantages since the products are superior in strength and durability as compared with prior art products based on untreated technical nylon fibers and polypropylene fibers.

DESCRIPTION OF THE PREFERRED EMBODIMENTS

The present invention is of cementitious composites and a method of manufacturing same which can be used to obtain stronger and more durable articles and structures. The cementitious composites according to the invention include modified and upgraded textile nylon fibers, cut into staples, which are used for reinforcing the cementitious matrix of cementitious composites, such as concrete.

The term "cementitious composite" as used herein in the specification and claims below indicates a hardened composite which includes a cementitious matrix which is formed by activating a cementitious material. The most common cementitious material is cement, which is activated to form a cementitious matrix in the presence of water. However the scope of the present invention is not limited to cement, and other cementitious materials such as, but not limited to, silicates, clay, gypsum and the like, are within the scope of the invention. Furthermore, the invention is not limited to cementitious materials which are water activated.

Beside the cementitious matrix, the cementitious composites according to the present invention may further include additional ingredients traditionally added to such composites to acquire same with specific characteristics such as strength, durability, workability, insulating properties, etc. Such traditional additives include, but are not limited to, aggregates and fines commonly used in concrete production.

One major problem associated with the use of nylon fibers in concrete reinforcement relates to their low stability in the cement alkaline medium and to outdoor ultraviolet radiation, moisture and heat service conditions. Under such conditions nylon is rapidly deteriorated.

Although nylon is more stable at higher than at lower pH conditions, it tends to undergo basic hydrolysis and degradation. Reports in the art's literature describe mechanical properties deterioration of nylon fibers when such fibers are subjected to pH 10.0 at 70° C. for a year, and a drop in the elongation of nylon fibers that were immersed in 10% sodium hydroxide solution for three months (M. I. Kohan, Nylon Plastics Hand Book. Hanser Publishers, 1995, page 49).

Furthermore, nylon fibers undergo photodegradation reactions that are catalyzed by titanium dioxide that the fibers contain as a delustering agent in their textile version (J. Zimmermann, Encyclopedia of polymer Science and Engineering. Second edition. John Willey and Sons. 1988, volume 2, page 358).

In addition, the effect of moisture on lowering the glass transition temperature of nylon bellow the ambient temperature, could causes aging deterioration processes involving disorientation and relaxation that deteriorate the original mechanical properties of the fibers in their dry state.

The technical nylon fibers that are currently used for concrete and other cementitious composites reinforcement have higher strength properties than standard textile nylon fibers, and contain stabilizers to combat the photo, hydrolytic and thermal degradation and deterioration herein described. Although inherently such technical fibers are subjected to hydrolysis reactions in the cement high pH, apparently they are stabilized well enough for their application in concrete secondary reinforcement. Nevertheless, as described in the background section above, should textile nylon fibers be upgraded to overcome their disadvantages as a concrete additive, they are expected to perform better both during settling and during service and environmental exposure.

The following tests on nylon 6 Caprolan-RC fibers and on nylon 6.6 Du Pont P1109 fibers were published by Nycon Inc. and Kapejo Inc. respectively.

These test results satisfy the requirements of the type III classification of the ASTM C1116-89 Standard for fiber reinforced concrete and shotcrete, which recite "synthetic fiber reinforced concrete and shotcrete which contains virgin homopolymer polypropylene fibers or other synthetic fibers for which documentary evidence can be produced confirming their long term resistance to deterioration when in contact with the moisture and alkalis present in cement paste or the substances present in air, entraining and chemical admixtures".

The present invention is directed at upgrading exiting textile nylon fibers to improve their strength and durability and therefore their concrete reinforcement efficiency via the potential benefits of crimp and texture, non round cross sections, very low fiber diameter (microfibers) and higher elongation or shrinkage, that are typical to existing textile fibers.

An attempt to improve the durability of polyamide made nylon fibers in the alkaline environment of a cementitious composite, via the application of microsilica that reduces the alkalinity of the mix is reported in U.S. Pat. No. 4,902,347.

The upgrading of existing textile nylon fibers according to the present invention is especially designed to overcome the drawbacks of nylon textile fibers as compared with technical nylon and other synthetic fibers for cementitious composites reinforcement. Mainly, the initial strength and the fibers stability in the cementitious matrix (high pH) and under outdoor conditions (ultraviolet radiation, humidity, thermal conditions, etc.) are increased, while, at the same time, maintaining the intrinsic advantages of textile nylon fibers as described in the background section above. Thus, the present invention permits upgrading of low and standard quality textile nylon fibers and other nylon fibers for improved application in concrete reinforcement. The nylon fibers according to the invention are superior to any existing fibers of their type in terms of environmental and service stability.

In order to satisfy the reinforcement requirements, the fibers should compete effectively with technical nylon fibers which are of higher strength and are currently used for concrete reinforcement. As already mentioned, technical nylon fibers are fairly stable under the chemical environment present in concrete mixes (high pH values) and under outdoor conditions such as UV, humidity and thermal exposures. However, since textile nylon fibers have advantages in other aspects, limiting their disadvantages in these respects would render them superior over technical nylon fibers. Thus, in order to use textile fibers in concrete reinforcement and enjoy their advantages in this respect as further described in the background section above, first they have to be upgraded to reduce or eliminate their disadvantages in this respect, as further elaborated above.

To this end, few properties of textile nylon fibers should be improved. First, the initial strength of the textile nylon fibers, e.g., their initial modulus and tenacity should increase beyond 40 and 5.0 grams/Denier, respectively, that are required for secondary concrete reinforcement. Second, the stability towards physical degradation and deterioration due to humidity as combined with thermal effects should be improved to a level which prevents mechanical strength deterioration to ineffective reinforcement levels due to the exposure of the fibers to moisture and temperatures above the glass transition temperature at the corresponding water up take of the fibers. Third, the stability towards chemical hydrolytic degradation should be increased by stabilization of the nylon fibers against basic hydrolysis. Fourth, the stability towards ultraviolet exposure should be increased, as textile fibers include titanium dioxide delustering agent that initiates photodegradation reactions. And finally, their stability towards aging and thermal exposure should be increased both during casting and in service life.

The following methods are used in order to achieve the required improvements in existing textile nylon fibers. Nevertheless, for some applications similar procedures may be implemented to improve technical nylon fibers.

(1) Initial Strength: According to the present invention the initial mechanical strength properties of the fibers (initial modulus, tenacity and toughness) are upgraded via a hot wet drawing/relaxing operation. Preferably, the process further applies a second stage drawing/relaxing to the fibers, performed at a high temperature (e.g., about 180° C.), which sets their morphology and properties, similar to those of technical fibers, e.g., higher degree of crystallinity, higher degree of orientation, relaxed frozen stresses and highly oriented amorphous phase.

(2) Mechanical stability towards hydrolytic/thermal effects: As a result of the drawing/relaxing operation and the higher structural stability due to the annealing process (lower frozen stresses and greater crystallinity), the higher glass transition temperature and degree of crystallinity lower the moisture permeability and shrinkage, thereby limiting the mechanical strength deterioration to low values, below the minimum required for the plastic cracking reinforcement of the fibers.

(3) Stability towards hydrolytic degradation: Chemical additives are applied to the fibers via wet impregnation/drying procedure which is conjugated with the wet drawing/relaxation operation. The additives include salts that undergo acid hydrolysis (e.g., zinc chloride and/or microsilica) and benzene phosphonic acid, in order to offset the basic pH in the concrete.

(4) Stability towards ultraviolet exposure: Finishing additives are applied to the fiber surfaces via impregnation and drying. Suitable reagents include manganese salts, hindered phenol and amine photo stabilizers, as well as phosphorous compounds that offset the photochemical degradation processes that the titanium dioxide delustrant in the fibers is catalyzing.

(5) Stability towards aging and thermal exposure: Finishing additives are applied to the fibers via impregnation and drying. Suitable reagents include phosphorous, amino and phenolic based antioxidants, as well as, copper iodide and potassium iodide heat stabilizers, which additives are typically added to technical nylon fibers during their manufacturing process, while in the polymer stage.

Please note that the methods of treating nylon fibers as specified above are novel with respect to the concept of modifying and upgrading original or, in other words, pre-existing fibers, which are preferably continues filaments, yarns or, preferably, tows. Traditionally, such and similar treatments are applied during the manufacturing process of the fibers. In sharp contrast, herein chemical and mechanical treatments, that are conventionally applied during the earlier polymerization or fiber formation stages, are applied to the final nylon product. Therefore, these methods may also be used to modify nylon wastes into raw materials for industries other than the concrete industry. These methods open a new way of exploiting nylon waste products, which otherwise would have been polluting the planet Earth. Thus, when the term "existing" is used herein in the specification and claims with respect to nylon fibers, it refers to pre manufactured fibers.

Thus, according to the present invention there is provided a method for upgrading existing nylon fibers. According to a preferred embodiment of the invention the method includes (a) impregnating the existing nylon fibers with a chemical for obtaining impregnated nylon fibers; (b) drawing the impregnated nylon fibers for obtaining drawn nylon fibers; and (c) drying the drawn nylon fibers for obtaining upgraded nylon fibers. Steps (a) and (b) are preferably performed at least partially simultaneously, as further described in the Examples section below. In another preferred embodiment of the invention the fibers are technical nylon fibers or textile nylon fibers. Preferably the fibers are existing textile nylon fibers which form waste, which is typically non biodegradable. Typically the existing nylon fibers include a nylon material such as, but not limited to, nylon 6.6, nylon 6, copolymer nylon 6.6, 6, copolymer nylon 6.6, 6.TA and/or nylon 6.4. As further detailed in the Examples section below, drawing the impregnated nylon fibers preferably includes hot wet and dry drawing and relaxing the impregnated nylon fibers. The upgraded fibers thus produced may serve as an additive to a cementitious composite and serve for reinforcing the cementitious composite. To this end, preferably the method further includes the step of cutting the upgraded nylon fibers into staples which are mixed with the cementitious composite prior to hardening. For most applications the staples may be packed in self disintegrating paper packages which may be added as are to a cementitious mix. Following the treatment herein described the upgraded nylon fibers preferably acquire superior basic hydrolysis resistance and superior ultraviolet stability, as compared with the existing nylon fibers which form the raw materials for the method. Furthermore, following the treatment herein described, the upgraded nylon fibers preferably acquire higher degree of crystallinity and orientation, relaxed frozen stresses and highly oriented amorphous phase, as compared with the existing nylon fibers. In addition, the upgraded nylon fibers acquire superior mechanical strength and superior mechanical strength retention when exposed to humidity and elevated temperature conditions, as compared with the existing nylon fibers. By providing fibers with medium elongation (e.g., 20–20%) and medium tenacity (e.g., 5–8 grams/Denier) one obtains modified fibers which are highly suitable to increase the impact resistance of the resulting concrete. Thus, modifying existing fibers allows for custom made modifications as required according to any specific implementation. For most applications the raw material existing fibers would have 1–15, preferably about 3 Denier, and a mixture of differing cross sections (e.g., trilobal, round, elliptical and/or subspherical). For some applications, the fibers are preferably selected crimped. Any suitable chemical may be used in the impregnation step of the method according to the present invention, depending on the properties required from the upgraded fibers. Preferred chemicals include, but are not limited to, a salt that undergoes acid hydrolysis, benzene phosphonic acid, a manganese salt, a hindered phenol photo stabilizer, a hindered amine photo stabilizer, a phosphorous compound for ultraviolet stabilization, a phosphorous, amino and phenolic based antioxidants and/or copper iodide. The function of these chemicals in upgrading existing nylon fibers is further detailed hereinabove, and in the Examples section hereinbelow.

Further according to the present invention provided is an upgraded nylon fiber, derived from existing nylon fiber by the method hereinabove described. As mentioned above, this upgraded nylon fiber acquires superior basic hydrolysis resistance, superior ultraviolet stability, higher degree of crystallinity and orientation, relaxed frozen stresses and highly oriented amorphous phase, superior mechanical strength and superior mechanical strength retention when exposed to humidity and elevated temperature conditions, all as compared with the existing nylon fiber from which it originated.

Further according to the invention provided is an upgraded nylon fiber which includes an existing nylon fiber and a chemical impregnated onto the existing nylon fiber. The chemical is preferably selected from the chemicals described above.

In addition, according to the present invention provided is a nylon fiber reinforced hardened cementitious composite including a hardened cementitious matrix which includes staples of textile nylon fibers. Preferably the textile nylon fibers are upgraded as herein described.

Furthermore, according to the present invention provided is a nylon fiber reinforced hardened cementitious composite including a hardened cementitious matrix which includes staples of upgraded nylon fibers. Preferably the upgraded nylon fibers are upgraded as herein described. The upgraded fibers may be derived from either textile or technical nylon fibers. Preferably, the upgraded fibers are derived from textile nylon fibers. Preferably, the fibers enjoy all the advantages associated with upgrading fibers as herein described, which advantages turn the fibers highly suitable for reinforcing hardened cementitious composites as further exemplified in the Examples section below.

According to the present invention there is further provided a method for manufacturing a nylon fiber reinforced hardened cementitious composite. The method includes the steps of (a) preparing a mix including a cementitious material, staples of upgraded nylon fibers and/or textile nylon fibers and an activating material (e.g., water) for activating said cementitious material to form a hardened cementitious matrix; (b) placing the mix; and (c) allowing the mix to harden.

The textile nylon fibers according to the present invention are used in the reinforcement of concrete as an alternative to the prior art wire mesh, polypropylene fibers and technical nylon fibers, and are more successful in inhibiting shrinkage cracking, increasing impact capacity, reducing permeability, adding shatter resistance and reducing construction time. Furthermore, since the present invention relates to existing nylon fibers, it provides new means to combat the accumulation of non biodegradable wastes.

Additional objects, advantages, and novel features of the present invention will become apparent upon examination of the following examples, which are not intended to be limiting.

EXAMPLE 1

Upgrading Nylon Fibers

As mentioned above, according to the present invention existing nylon fibers are upgraded to meet the requirements of a nylon concrete additive directed at reinforcing the hardened cementitious matrix therein. Suitable fibers are textile nylon fibers, preferably featuring the properties listed in table I above. These fibers are typically available as continuos filaments, yams (threads) and tows, which include bundles of fibers. The type of nylon may be any commercially available type, including, but not limited to, nylon 6.6, nylon 6, copolymer nylon 6.6, 6, copolymer nylon 6.6, 6.TA and nylon 6.4. Most available are yams or tows of nylon 6.6 and nylon 6, characterized by 0.5 to 50 Denier per filament and total Denier range of 100 to 8,000,000. The textile fibers may be of any brightness type including bright, semi dull and dull.

To implement the method for upgrading nylon fibers, the yam or tow may be fed to an upgrading line from one source or many smaller Denier sources present on a suitable creel. The tow is fed into an impregnation unit which includes (i) an inlet tensioning and guiding mechanism; (ii) a solution bath supplemented with heaters; and (iii) concentration control and squeeze rollers having a pneumatic pressure controller.

The impregnated tow is undergoing a wet stretch in boiling water or solution containing any required additive[]s). Thereafter, the wet tow is dried over a set of hot goddets. The dry tow undergoes a further hot dry stretch. The stretched tow undergoes a hot dry contraction and relaxation. The resulting tow is fed into a cutter that provides the required cut length staples. The conditions under which the process is conducted are correlated to provide fibers of the required chemicals uptake level and mechanical properties.

For best results, the following parameters are preferably employed:

(1) Draw/Impregnation line parameters:

Feeding speed: 10–500 m/min, preferably about 75 m/min.

Total draw ratio: 1.1 –1.4 X, preferably about 1.3 X.

Wind up speed: 11 –700 m/min, preferably about 100 m/min.

Squeeze rolls pressure: 1 –20 Knewton, preferably about 10 Knewton

Impregnation bath temperature: up to the boiling temperature.

Wet draw bath temperature: up to the boiling temperature.

Hot goddets temperature: 70 –230° C., preferably about 180° C.

(2) Impregnating chemicals: The preferred types and concentrations of chemicals present in the solution bath of the impregnation unit in weight percents are given hereinbelow:

Benzene phosphonic acid: 0.4 –8, preferably about 4.0.

Manganese lactate: 0.1 –1.0, preferably about 0.5.

Copper acetate: 0.5 –5.0, preferably about 1.0.

Potassium iodide: 4.0 –18.0, preferably about 6.0.

(3) Uptake of impregnated chemicals:

The preferred uptake of various chemicals in ppm weight, unless otherwise indicated, is given below:

Benzene phosphonic acid: 60–800 phosphorous, preferably about 400.

Manganese lactate: 10–60 manganese, preferably about 50.

Copper acetate: 75–300, preferably about 100.

Potassium iodide : 450 –1,800, preferably about 600.

The liquor uptake: 0.1–10.0 weight percent, preferably about 1.0 weight percent.

Textile tows of 3 Denier per filament, 40% elongation and 5.0 grams/Denier tenacity were subjected to the above described modification, including an overall draw ratio of 1.20 X. The resulting fibers had increased tenacity (7.0 grams/Denier) and reduced elongation values (20%). The conditions may be selected to obtain any desired properties.

The following methods were employed to test the durability of the upgraded nylon fibers in the concrete and the durability of the resulting nylon reinforced concrete.

EXAMPLE 2

Accelerated Aging Test of the Fiber Reinforced Concrete

The durability of the fiber reinforced concrete of the present invention was determined following the protocol developed by Balaguru, essentially as described in P. Balaguru and K. Slattum (1995) Test method for durability of polymeric fibers in concrete and UV light exposure. In, "Testing of fiber reinforced concrete" D. J. Stevens, et al., Eds., aci SP-155, which is incorporated by reference as if fully set forth herein.

The accelerated aging test: Fiber reinforced concrete samples were stored in lime saturated water and were maintained at elevated temperature levels varying from 50 to 80° C. The accelerated aging tests were run for up to 52 weeks, which are equivalent to 100 years. Immersion of the sample in lime saturated water at 50° C. for 24 hours was shown to be equivalent to 101 days of natural weather exposure with a mean temperature of 10.4° C. The durability was studied using flexural test specimens. Both flexural strength and flexural toughness were measured at various stages of accelerated aging.

Concrete mix proportion: The composition tested included 307, 813, 1,068 and 177 $Kg/m^3$ of cement, sand, coarse aggregate and water, respectively. In addition, 500 and 709 $ml/m^3$ of high range water reducing and air entraining admixtures, respectively, were used. A high fiber content of 4.75 $Kg/m^3$ was used in order to obtain well defined load deflection responses. The load deflection curves were used in order to compute toughness indices. The flexural strength test followed the ASTM C 1018 test method for flexural toughness and first crack strength of fiber reinforced concrete (using a beam with third point loading).

The ASTM C 1018 test method, which is published in the ACI 544.22-89, is incorporated by reference as if fully set forth herein. Briefly, the method is used to evaluate the flexural toughness of fiber reinforced concrete specimens by measuring the area under their load deflection curves, up to specified multiples of the first crack deflection. A toughness index (e.g., I5, I10 and I30 is obtained by normalizing the area up to the prescribed deflection (e.g., X3,X5.5 and X15.5, respectively) by the area under the diagram up to the first crack deflection.

Fibers Tested Were:

Untreated textile staple fibers of 3 Denier per filament and about 18 mm cut length.

Treated textile staple fibers of 3 Denier per filament and about 18 mm cut length.

Nycon, which is a nylon fiber of Denier per filament and about 19 mm cut length.

PP, which is a polypropylene fibrilated fiber.

Aging Test Results:

Tables 2–4 below summarize the toughness indices results at various stages of accelerated aging.

TABLE 2

| I5 — toughness at deflection of 3 times the first crack deflection | | | | | |
|---|---|---|---|---|---|
| Fiber | 0 weeks | 8 weeks | 16 weeks | 32 weeks | 52 weeks |
| Untreated | 3.3 | 3.6 | 3.5 | 3.0 | 2.9 |
| Treated | 4.3 | 4.9 | 4.8 | 4.5 | 4.5 |
| Nycon | 4.1 | 5.2 | 5.0 | 4.5 | 4.3 |
| PP | 4.3 | 5.0 | 4.8 | 4.7 | 4.9 |

TABLE 3

I10 — toughness at deflection 5.5 times the first crack deflection.

| Fiber | 0 weeks | 8 weeks | 16 weeks | 32 weeks | 52 weeks |
|---|---|---|---|---|---|
| Untreated | 5.0 | 5.6 | 4.9 | 4.5 | 3.8 |
| Treated | 7.5 | 10.4 | 10.3 | 9.2 | 9.0 |
| Nycon | 6.2 | 11.0 | 9.5 | 8.8 | 7.5 |
| PP | 7.5 | 7.6 | 7.8 | 9.3 | 7.5 |

TABLE 4

I30 — toughness at deflection 15.5 times the first crack deflection

| Fiber | 0 weeks | 8 weeks | 16 weeks | 32 Weeks | 52 weeks |
|---|---|---|---|---|---|
| Untreated | 13.0 | 19.0 | 18.2 | 15.9 | 5.0 |
| Treated | 16.8 | 40.3 | 38.6 | 32.0 | 23.0 |
| Nycon | 16.3 | 38.5 | 27.0 | 27.7 | 19.5 |
| PP | 10.3 | 10.4 | 10.4 | 9.8 | 10.1 |

As is evident from Tables 2–4 above, best results were obtained using the fibers treated according to the teachings of the present invention.

The values I30/I10 and I10/I5 are herein used to estimate the ability of the fiber reinforced concrete to sustain loads at large deformations. Values obtained after 52 weeks of accelerated aging are listed in Table 5 below.

TABLE 5

| Fiber | I30/I10 | I10/I5 |
|---|---|---|
| Untreated | 1.30 | 1.31 |
| Treated | 2.50 | 2.00 |
| Nycon | 2.60 | 1.74 |
| PP | 1.34 | 1.53 |

EXAMPLE 3

UV Stability Test

No standard test method exists for evaluating the durability of fibers used in concrete that are exposed to ultraviolet radiation. ASTM D 4355 standard method for evaluation of geotextile fibers deterioration when exposed to light and water has been used, since the exposure conditions seen by geotextiles and fiber reinforced concrete are very similar.

According to this test the fibers are subjected to a wavelength spectrum closely simulating that of the sunlight at 0.35 W/m$^2$. Thus, the tested fiber samples were exposed to water, as expected in an exterior application. A test temperature of about 65° C., which is within the temperature range that concrete would reach during the summer, was selected. The fibers were exposed to ultraviolet light for time intervals of 0, 150, 300, and 500 hours, and thereafter tested for percent breaking strength retained on an Instron Tensile Testing Machine. The fibers tested are described under example 2, above.

The percentage of retained breaking strength after the different exposure times are given in Table 6, below.

TABLE 6

| Fiber | Exposure time (Hr.) | % strength retained |
|---|---|---|
| Untreated | 0 | 100 |
|  | 150 | 88 |
|  | 300 | 80 |
|  | 500 | 60 |
| Treated | 0 | 100 |
|  | 150 | 110 |
|  | 300 | 120 |
|  | 500 | 98 |
| Nycon | 0 | 100 |
|  | 150 | 110 |
|  | 300 | 115 |
|  | 500 | 95 |
| PP | 0 | 100 |
|  | 150 | 90 |
|  | 300 | 48 |
|  | 500 | 10 |

Thus, as is evident from the Examples section, the upgraded fibers proved to be stable in the concrete environment. The High pH stability of the fibers matches that of the polypropylene made fibers and is equivalent or higher than the stability record for the technical nylon fibers. The stability of the treated fibers towards ultraviolet radiation is greater than that of the technical nylon fibers, and much exceeds that of the polypropylene fibers which tend to degrade under UV exposure.

While the invention has been described with respect to a limited number of embodiments, it will be appreciated that many variations, modifications and other applications of the invention may be made.

What is claimed is:

1. A nylon fiber reinforced hardened cementitious composite comprising a hardened cementitious matrix, said cementitious matrix including staples of textile nylon fibers, said textile nylon fibers having a thickness between 1 and 15 Denier, modulus between 25 and 40 gram/Denier, tenacity between 3 and 5 gram/Denier and elongation capability between 35 and 45%.

2. A cementitious composite as in claim 1, wherein said textile nylon fiber are upgraded by a method including the steps of:
    (a) impregnating said textile nylon fibers with a chemical for obtaining impregnated nylon fibers, said chemical is selected so as to upgrade said existing nylon fibers to have a property selected from the group consisting of improved stability towards hydrolytic degradation, improved stability towards ultraviolet exposure, improved stability towards aging and improved stability towards thermal exposure;
    (b) drawing said impregnated nylon fibers for obtaining drawn nylon fibers; and
    (c) drying said drawn nylon fibers for obtaining upgraded nylon fibers.

3. A cementitious composite as in claim 1, wherein said textile nylon fibers include a nylon material selected from the group consisting of nylon 6.6, nylon 6, copolymer nylon 6.6, 6, copolymer nylon 6.6, 6.TA and nylon 6.4.

4. A cementitious composite as in claim 2, wherein said drawing of said impregnated nylon fibers includes hot wet and dry drawing and relaxing of said impregnated nylon fibers for obtaining said drawn nylon fibers.

5. A cementitious composite as in claim 2, wherein said upgraded nylon fibers acquire superior basic hydrolysis resistance and superior ultraviolet stability.

6. A cementitious composite as in claim 2, wherein said upgraded nylon fibers acquire higher degree of crystallinity and higher degree of orientation, relaxed frozen stresses and highly oriented amorphous phase.

7. A cementitious composite as in claim 2, wherein said upgraded nylon fibers acquire superior mechanical strength and superior mechanical strength retention when exposed to humidity and elevated temperature conditions.

8. A cementitious composite as in claim 1, wherein said textile nylon fibers have differing cross sections.

9. A cementitious composite as in claim 1, wherein said textile fibers are crimped fibers.

10. A cementitious composite as in claim 2, wherein said chemical is selected from the group consisting of a salt that undergoes acid hydrolysis, benzene phosphonic acid, a manganese salt, a hindered phenol photo stabilizer, a hindered amine photo stabilizer, a phosphorous compound for ultraviolet stabilization, a phosphorous, amino and phenolic based antioxidants and copper iodide, copper acetate, potassium iodide, potassium bromide, zinc chloride and microsilica.

11. A cementitious composite as in claim 2, wherein step (a) and step (b) are executed at least partially simultaneously.

12. A nylon fiber reinforced hardened cementitious composite comprising a hardened cementitious matrix, said cementitious matrix including staples of nylon fibers being chemically upgraded prior to mixing with a cementitious material forming said hardened cementitious matrix to have a property selected from the group consisting of improved stability towards hydrolytic degradation, improved stability towards ultraviolet exposure, improved stability towards aging and improved stability towards thermal exposure.

13. A cementitious composite as in claim 12, wherein said upgraded nylon fiber are upgraded by a method including the steps of:

(a) impregnating existing nylon fibers with a chemical for obtaining impregnated nylon fibers, said chemical is selected so as to upgrade said existing nylon fibers to have said property selected from the group consisting of said improved stability towards hydrolytic degradation, said improved stability towards ultraviolet exposure, said improved stability towards aging and said improved stability towards thermal exposure;

(b) drawing said impregnated nylon fibers for obtaining drawn nylon fibers; and (c) drying said drawn nylon fibers for obtaining said upgraded nylon fibers.

14. A cementitious composite as in claim 12, wherein said upgraded nylon fibers include a nylon material selected from the group consisting of nylon 6.6, nylon 6, copolymer nylon 6.6, 6, copolymer nylon 6.6, 6.TA and nylon 6.4.

15. A cementitious composite as in claim 13, wherein said drawing of said impregnated nylon fibers includes hot wet and dry drawing and relaxing of said impregnated nylon fibers for obtaining said drawn nylon fibers.

16. A cementitious composite as in claim 12, wherein said upgraded nylon fibers are acquired superior basic hydrolysis resistance and superior ultraviolet stability.

17. A cementitious composite as in claim 12, wherein said upgraded nylon fibers are acquired higher degree of crystallinity and higher degree of orientation, relaxed frozen stresses and highly oriented amorphous phase.

18. A cementitious composite as in claim 12, wherein said upgraded nylon fibers are acquired superior mechanical strength and superior mechanical strength retention when exposed to humidity and elevated temperature conditions.

19. A cementitious composite as in claim 13, wherein said existing nylon fibers have a Denier ranging between 1–15.

20. A cementitious composite as in claim 12, wherein said upgraded nylon fibers have differing cross sections.

21. A cementitious composite as in claim 12, wherein said upgraded fibers are crimped fibers.

22. A cementitious composite as in claim 13, wherein said chemical is selected from the group consisting of a salt that undergoes acid hydrolysis, benzene phosphonic acid, a manganese salt, a hindered phenol photo stabilizer, a hindered amine photo stabilizer, a phosphorous compound for ultraviolet stabilization, a phosphorous, amino and phenolic based antioxidants and copper iodide, copper acetate, potassium iodide, potassium bromide, zinc chloride and microsilica.

23. A cementitious composite as in claim 13, wherein step (a) and step (b) are executed at least partially simultaneously.

* * * * *